United States Patent
Yamauchi et al.

(10) Patent No.: US 7,827,571 B2
(45) Date of Patent: Nov. 2, 2010

(54) DISK DRIVE DEVICE HAVING AIR STREAM RESTRICTIVE DEVICE

(75) Inventors: Yoshiaki Yamauchi, Minori (JP);
Hideyuki Onuma, Urayasu (JP);
Kuniyuki Kimura, Fujisawa (JP);
Sojiro Kirihara, Kawasaki (JP); Shinya Tsubota, Mito (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 598 days.

(21) Appl. No.: 11/214,626

(22) Filed: Aug. 29, 2005

(65) Prior Publication Data

US 2006/0117326 A1    Jun. 1, 2006

(30) Foreign Application Priority Data

Nov. 30, 2004    (JP) ............................. 2004-345083

(51) Int. Cl.
*G11B 17/04* (2006.01)
*G11B 33/14* (2006.01)

(52) U.S. Cl. ...................................... 720/651; 720/603

(58) Field of Classification Search ................. 720/600, 720/601, 603, 651, 688, 611; 360/97.02, 360/97.03
See application file for complete search history.

(56) References Cited

U.S. PATENT DOCUMENTS

| 5,140,579 | A | * | 8/1992 | Suzuki et al. | ................ | 720/611 |
| 6,900,962 | B1 | * | 5/2005 | Forbord | ................... | 360/97.02 |
| 2001/0026520 | A1 | * | 10/2001 | Watanabe et al. | ........... | 369/75.2 |
| 2002/0036862 | A1 | * | 3/2002 | Tsang et al. | ............. | 360/97.02 |
| 2002/0044376 | A1 | * | 4/2002 | Serizawa et al. | .......... | 360/97.02 |
| 2002/0071203 | A1 | * | 6/2002 | Nakamoto et al. | ....... | 360/97.02 |
| 2004/0042371 | A1 | * | 3/2004 | Lee | ............................ | 369/75.2 |

FOREIGN PATENT DOCUMENTS

| JP | 10-208357 | 8/1998 |
| JP | 2002-093138 | 3/2002 |
| KR | 10-2004-0003842 | 1/2004 |

* cited by examiner

*Primary Examiner*—Brian E Miller
*Assistant Examiner*—Adam B Dravininkas
(74) *Attorney, Agent, or Firm*—Townsend and Townsend and Crew LLP

(57) ABSTRACT

A disk drive device has a configuration in which one of stepped parts defined by a circular recess for guiding a disc, formed in a disc tray is substantially flush with the bottom surface of the circular recess even in an area beyond the outer peripheral part of a disc so that no air cavity part facing the outer peripheral side surface of the disc is induced around the disc. Thereby, it is possible to aim at lowering cavity noise caused by the air cavity during high speed rotation and fluid noise caused by turbulence.

2 Claims, 5 Drawing Sheets

DISK DRIVE DEVICE HAVING AIR STREAM RESTRICTIVE DEVICE

FIELD OF THE INVENTION

The present invention relates to a disk or disc drive device of a disc displaceable type such as a CD drive device, a DVD drive device or the like.

For example, JP-A-2002-93138 and JP-A-10-208357 disclose conventional disk drive devices. The disk drive device disclosed in the former document has a drawer including a drawer frame having a planar part which defines therein a planar zone in parallel with a rotating surface of a disc, and a drawer wall surface part which is plate-like and cylindrical along the outer periphery of the disc, and which is formed at a height different from that of a plane in extension of the planer part but substantially equal to that of the upper surface of the rotating disc, wherein an end surface of the drawer wall surface part which is adjacent to the planar part is formed into a spherical or chamfered surface, or alternatively, the surface of the drawer wall surface part on the planar part side is formed with irregular grooves capable of lowering wind noise which is caused by the rotation of the disc. Further, the later document discloses a disk drive device in which a loaded disc is set on a turn table fitted on a spindle motor while a unit mechanism portion incorporating an optical head is moved up and down by a predetermine distance to and from the disc surface. Further, an elevating mechanism is provided as a means for moving the unit mechanism portion up and down, and when the disc is on loading, a protrusion abuts against the lower surface side of a disc tray which is therefore pressed.

In a CD or DVD device of a slim type having a thickness of not greater than 12.7 mm, since a disc is rotated at a high speed during recording or reproduction, fluidic noise is intensified by a stream of air flowing between the disc surface and components adjacent to the disc, or vibration noise of a structural component excited by a fluid force as a vibration source is intensified. The spherical or chamfered surface configuration of the side wall of the disc tray facing the side surface of the disc as disclosed in the JP-A-2002-93138 is only for a traveling part of the optical pick-up, and accordingly, it cannot reduce cavity noise caused by another structure such as a stepped part and air-hole configuration around the disc, which are actually present in the disc tray.

In the case of the disk drive device of the slim type, a unit mechanism portion incorporating a spindle motor, an optical head and means for moving the optical head, is elastically supported to the lower surface of the disc tray by means of an insulator, and accordingly, the disc tray integrally incorporated with the unit mechanism is moved in order to load the disc thereon. Thus, due to a physical limitation to the thickness of the device, the application of the elevating mechanism disclosed in JP-A-10-208357 is difficult. Although rattling vibration noise can be absorbed by pressing a structural component, noise caused by an air stream during rotation of a disc cannot be reduced.

BRIEF SUMMARY OF THE INVENTION

An object of the present invention is to reduce noise in a disk drive device caused by disc rotation, in particular cavity noise caused by an air stream in the vicinity of a disc surface and fluid noise caused by another structure in the vicinity of the outer periphery of the disc, such as a stepped part of a disc tray structure.

To the end, according to the present invention, a right inward stepped part, as viewed from a front panel as a front surface of a disc tray for transferring a disc, which is one of stepped parts in the outer periphery of a circular recess for setting and guiding the disc, has a stepped height not greater than that of the lower surface of the disc, i.e., 0.5 mm, measured from the bottom surface of the circular recess. Further, a corner part of a device housing which is adjacent to a corner part of the disc tray having the stepped height of not greater than the height between the bottom surface of the circular recess and the lower surface of the disc, i.e., 0.5 mm, has a corner structure having a curvature on the inward side of the housing or a corner structure formed by a plurality of obtuse angles. This corner structure may be materialized by a curvature member incorporated in a guide rack, a curvature member as a separate member incorporated in a part of a bottom or top cover which is a part of the device housing, or a curvature defined by the bottom or top cover itself. Further, a stream restricting member may be incorporated in an air cavity part between the outer peripheral part of the circular recess for setting and guiding a disc in the disc tray for transferring a disc, and the bottom or top cover which is a part of the device housing through the intermediary of the guide rack.

According to the present invention, since it is possible to prevent a stream of air along the outer peripheral part of a disc from becoming turbulent even though the disc is rotated at a high speed, fluidic noise caused by fluid can be lowered. Further, cavity noise caused by an air cavity which is defined in a part opposed to the outer peripheral surface of the disc can be also lowered. With this configuration, noise in the disk drive device can be lowered during high speed reproduction or recording, thereby it is possible to enhance the reliability of the disk drive device.

Other objects, features and advantages of the invention will become apparent from the following description of the embodiments of the invention taken in conjunction with the accompanying drawings.

DETAILED DESCRIPTION OF THE INVENTION

A disk drive device for CD or DVD, which is incorporated in a personal computer is adapted to reproduce information or data on a disc-like medium (which will be hereinbelow referred to as "disc") having a diameter of 120 mm and a thickness of 1.2 mm, or to record new data onto the disc. The disk drive device according to the present invention is, in particular, of a thin type, such as the so-called slim drive or super slim drive, having a thickness of 12.7 mm, 9.5 mm or not greater than that.

Explanation will be hereinbelow made of several embodiments of the present invention with reference to the accompanying drawings.

Figure 1:
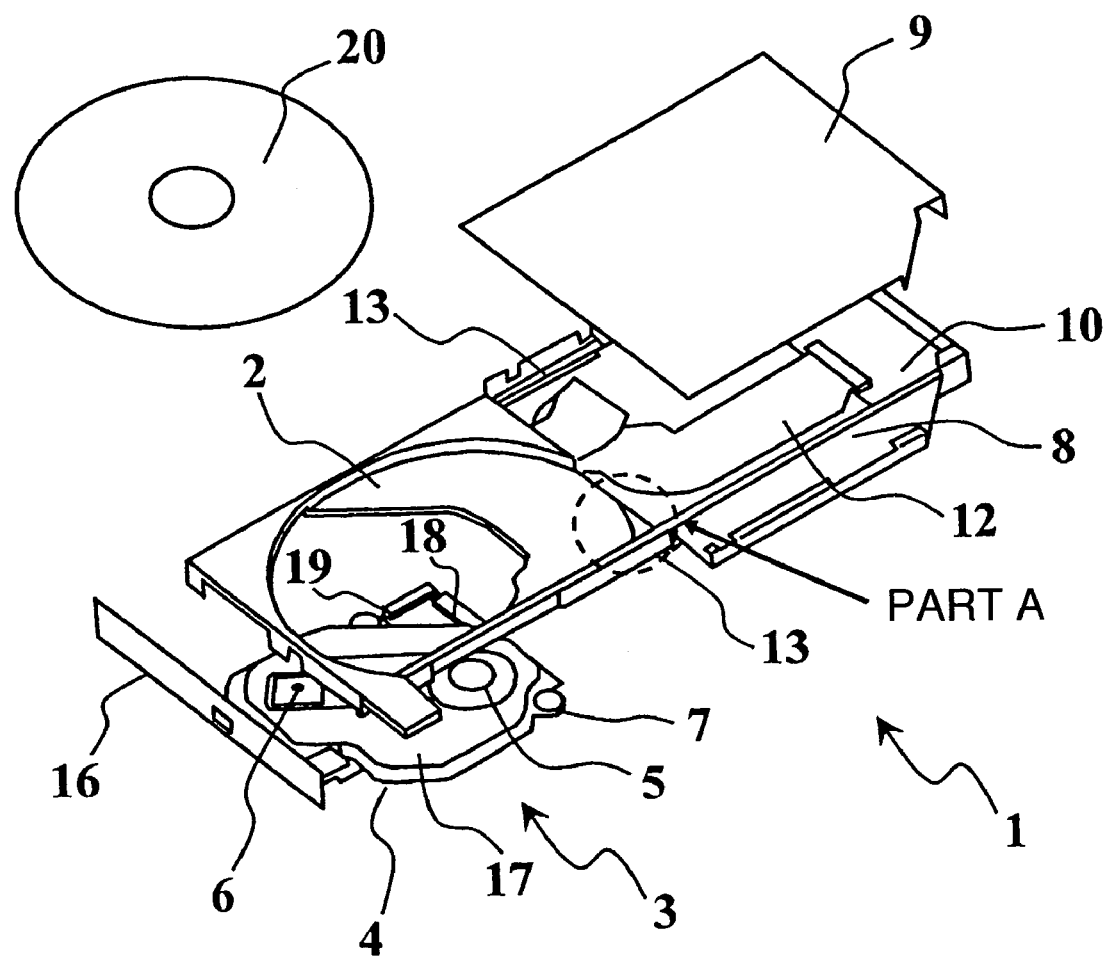
FIG. 1 is an exploded perspective view illustrating an example of a disk drive device according to the present invention.

Referring to FIG. 1 which is an exploded perspective view illustrating an example of a disk drive device according to the present invention, in this case, explanation will be made of a disk drive device 1 having a thickness of, for example, 9.5 mm.

The disk drive device 1 has an external shape with a width of about 130 mm and the depth of about 130 mm, and has an outer housing in combination of a bottom cover 8 and a top cover 9 fitted together, which are made of thin metal sheet by pressing. The housing is provided therein with a disc tray 2 of resin molding, which can be slid by means of guide mechanisms (which will be hereinbelow referred to as "guide racks 13" as components thereof) that are laid in opposite side parts of the bottom cover 8 inside of the latter, in order to load and unload a disc 20. Further, the disc tray 2 is fitted therein and coupled thereto with a front panel 16 as a separate component, in front thereof, and is formed in its substantially center part with a circular recess having a diameter slightly larger than the outer diameter of the disc 20. An aperture through which a unit mechanism 3 is mounted is formed in the disc tray 2, being extended from the center part to the side part of the circular recess. The unit mechanism 3 is composed of a spindle motor 5 for rotating the disc 20, a turn table for carrying thereon the disc 20, an optical head 6 for reproducing and recording data from and to the disc 20, drive means for displacing the optical head 6 to a predetermined position in a radial direction of the disc 20 and a unit cover 17 for preventing any component from being made into contact with an outside member, and also electrical noise from being produced, these components being all incorporated in a mechanical chassis 4. The unit mechanism 3 is attached to the lower surface of the disc tray 2 through the intermediary of a plurality of insulators serving as elastic members. The insulators 7 attenuate vibration and impacts transmitted from the outside of the unit to the unit mechanism 3.

The bottom cover 8 is incorporated in its rear part with a main circuit board 10, and the spindle motor 5, the optical head 6 and the drive means for displacing the optical head are electrically connected by an FPC 12 which connects between a connector portion 19 provided in the spindle motor base board 18 and the main circuit board 10.

The disk drive device 1 according to the present invention has a structure which aims at reducing noise of the device relating to a fluid force generated due to high speed rotation of the disc 20 within a narrow space. In particular, in order to reduce cavity noise caused by stepped parts of structural components which are opposed to the outer peripheral side surface of the disc 20 or an air cavity structure, a stepped part which is defined by a disc guide recess formed in the disc tray 2, in a corner part inward from the right side of the disk drive device 1 (refer to the part A in the figure) is substantially flush with the bottom surface of the circular recess. Detailed explanation will be hereinbelow made of the disk drive device according to the present invention.

Figure 2A:
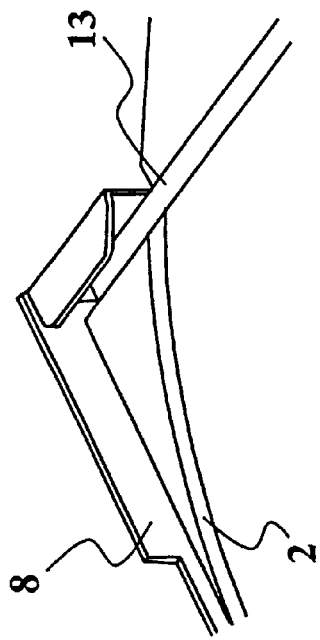
FIG. 2A is a view illustrating a conventional disc tray structure.
Figure 2B:
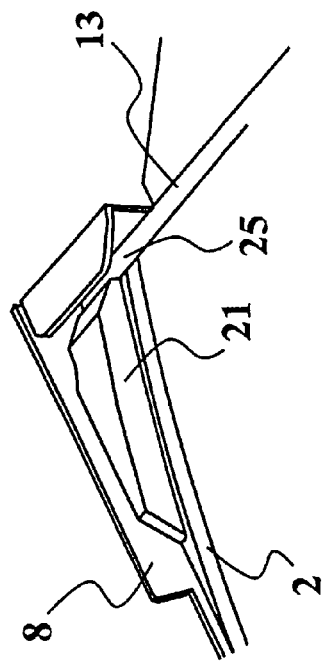
FIG. 2B is a view for explaining a stream of air around a disc during high speed rotation in FIG. 2A.

FIGS. 2A and 2B respectively show a conventional structure of a disk drive device loaded therein with a disc, in the part A shown in FIG. 1, and a stream of air around the disc 20 in a cross-section in a plane passing through a substantially thicknesswise center of the disc 20 which is rotated at a high speed. That is, FIG. 2A is a view which shows a side stepped part 21 of the circular recess formed in the disc tray 2 while FIG. 2B is a schematic view which shows the stream of air around the disc 20 which is rotated clockwise.

Although a gap defined between the side wall of the circular recess formed in the disc tray 2 and the outer peripheral side surface of the disc 20 has a width which is in a range about 1 to 2 mm, this gap along the outer peripheral side surface of the disc 20 is not uniform in an actual disk drive device, in the upper part, the left and right parts of the disc tray 2 as shown in FIG. 2B. The stream of air branches at two positions along the outer peripheral side surface of the disc 20. In the left branching part as viewed in the figure, since the passage through which the air flows along the housing part of the disk drive device is longer, and since an electric connector for external connection is present in the passage, the stream of air is substantially blocked. In the right upper branching part (the part B) as viewed in the figure, the passage is divided into two separate gaps, that is, a gap between the side wall of the circular recess formed in the disc tray 2 and the outer peripheral side surface of the disc 20 and a gap between the rear surface of the device housing and the rear surface of the disc tray 2. Thus, the stream of air is inducted in two passages and then these two streams cross to each other in their forward directions. Thus, since the two streams cross to each other, the streams become turbulent so as to intensify fluid noise. There would be such a risk that cavity noise caused by an air cavity 25 presented in the surface facing the outer peripheral side surface of the disc 20 is intensified. According to the present invention, there is provided an internal structure of a disk drive device in order to lower the fluid noise and the cavity noise as stated above.

Figure 3A:
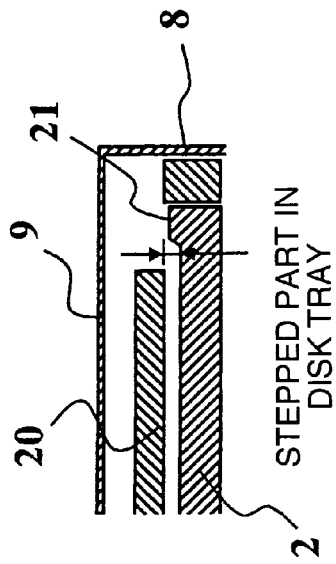
FIGS. 3A and 3B are views illustrating a peripheral structure of a disc tray in a disk drive device in an embodiment of the invention.
Figure 3B:
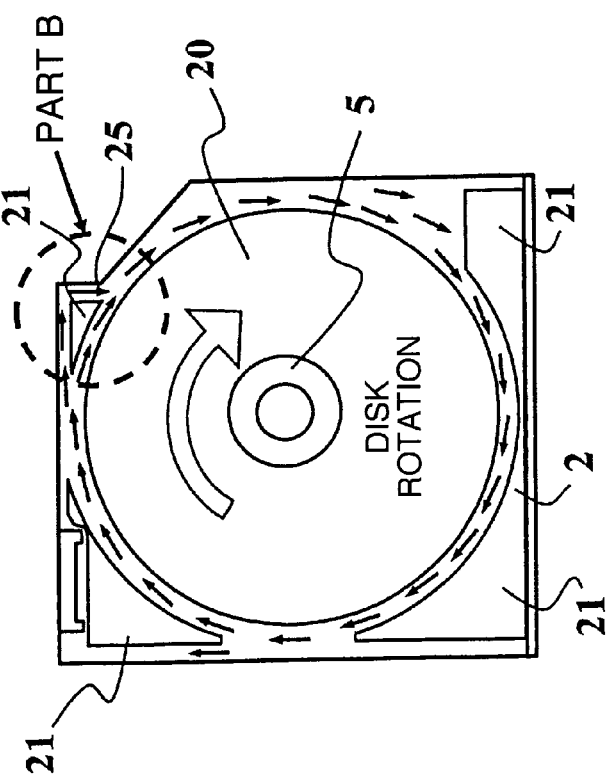

FIGS. 3A and 3B show an embodiment of the present invention, and, in particular, show a structure of the disc tray 2 corresponding to the part A of the disk drive device shown in FIG. 1.

FIG. 3A shows such a condition that the disc tray 2 is retracted into the device housing. The disc tray 2 is slidably supported by guide racks 13 laid on opposite sides thereof, and is secured in the condition that it is retracted into the device housing. The upper surface parts of the guide racks 13 and the bottom surface part of the circular recess formed in the disc tray 2 are laid substantially in the same plane. The side walls of the housing is formed by bending the bottom cover 8 so as define side surfaces. According to the present invention, a stepped part 21 inward of the right side of the device, which is defined by the circular recess for guiding a disc formed in the disc tray 2 (refer to FIGS. 2A and 2B), is removed, and accordingly, this part is substantially flush with the bottom surface of the circular recess.

FIG. 3B is as a schematic sectional view which shows the peripheral structure of the disc tray 2 on which the disc 20 is loaded. A gap between the bottom surface of a circular recess formed in the disc tray 2 and the lower surface of the mounted disc 20 has a width which is about 0.5 mm. A stream of air induced through rotation of the disc 20 along the outer peripheral part of the disc has a high flow rate in the vicinity of the side surface of the disc 20, and accordingly, in order to prevent affection upon the stream, a stepped part of the outer peripheral part which is extended around the disc 20 and which is formed in the disc tray 2, has to have a height which is not greater than the width of the gap underneath the lower surface of the disc 20, i.e., 0.5 mm. That is, the stepped part 21 in a left inward part of the device, which is defined by the circular recess for guiding the disc formed in the disc tray 2, has a height which is set to be not greater than 0.5 mm measured from the bottom surface of the circular recess. With this configuration, since the branching part indicated by the part B shown in FIG. 2B is not present, crossing of streams is eliminated. Further, since an air cavity which would be present in the surface facing the outer peripheral side surface of the disc 20 can be eliminated, it is possible to aim at lowering cavity noise.

Figure 4A:
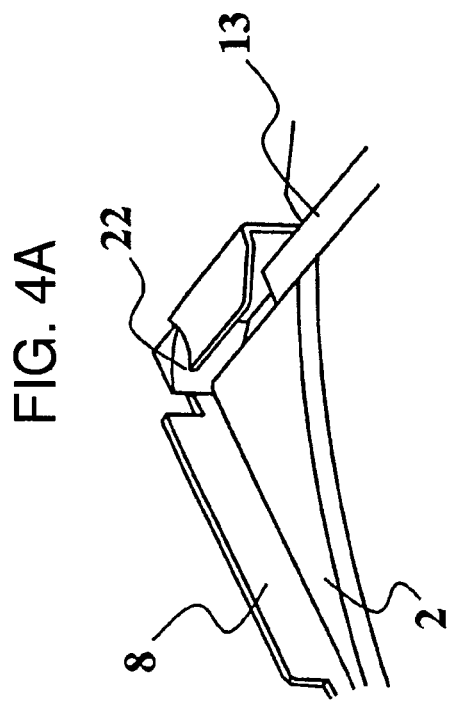
FIG. 4 is a view illustrating a peripheral structure of a disc tray in a disk drive device of another embodiment of the invention.
Figure 4B:
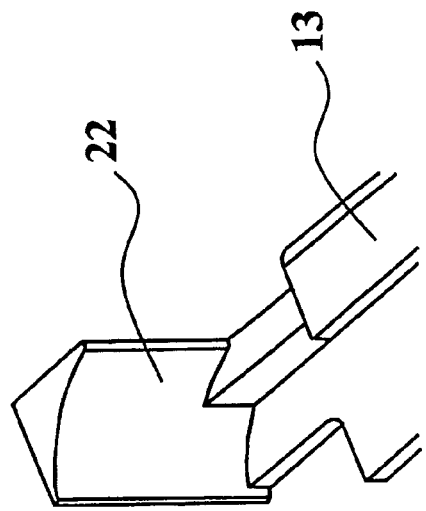

FIGS. 4A and 4B show a part of a disc tray structure and a part of a guide rack structure in an example according to the invention.

FIG. 4A shows an embodiment of the present invention in which a corner part in an inside surface surrounded by the bottom cover 8 defining a wall of the housing of the disk drive device, has a curvature in addition to the structure of the disc tray 2 shown in FIGS. 3A, 3B. In order to cause the inside surface to have a curvature, a curvature member 22 is prevented in the distal end part of the guide rack 13 which is one of components of a guide mechanism, in this embodiment. With this configuration, the stream of air at the inside surface corner part in the device can be prevented from becoming turbulent, by the provision of the curvature. Thereby, it is possible to lower fluid noise caused by turbulence. Although explanation has been made of the curvature member incorporated in the guide rack in this embodiment with reference to the figure, the structure of the curvature member may be incorporated in the bottom or top cover which is a part of the device housing.

FIG. 4B shows the guide rack 13 incorporated with an inside surface curvature member 22. The curvature member 22 provided to the distal end part of the guide rack has a curvature which is preferably in a range from about R: 2 mm to R: 5 mm. Further, even such a structure that the inside surface is defined by a plurality of obtuse angles can exhibit similar technical effects and advantages.

Figure 5:
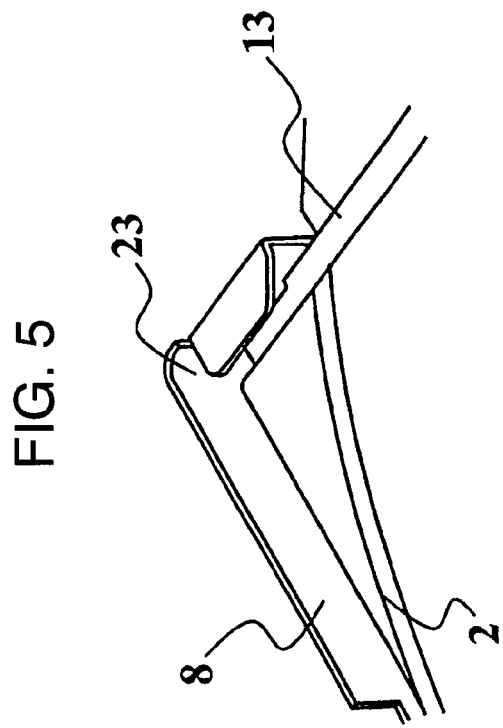
FIG. 5 is a view illustrating a peripheral structure of a disc tray in a disk drive device of another embodiment of the invention.

FIG. 5 shows a part of the structure of the disc tray in another embodiment of the present invention, and the structure of the bottom cover around the former.

In this embodiment, an inside surface corner part surrounded by the bottom cover 8 defining a wall of the housing of the disk drive device has a curvature 23 in addition to the structure of the disc tray 2 shown in FIGS. 3A and 3B. That is, the corner part of the housing is formed therein with the curvature 23 directly by the bottom cover 8. Further, there may be used such an inside wall structure that the housing corner part is bent at a plurality of obtuse angles by means of the bottom cover 8. With the structure having the curvature or a plurality of bent shapes, the stream of air is prevented from becoming turbulent at the inside surface corner part in the device, thereby it is possible to prevent occurrence of turbulence. With this configuration, it is possible to lower fluid noise caused by turbulence. In this embodiment, although explanation has been made of an example in which the inner wall structure of the device is formed from the bottom cover, in the case of an inner wall structure of the device formed from the top cover, it goes without saying that a similar structure obtained by using the top cover can exhibit the same technical effects and advantages.

Figure 6A:
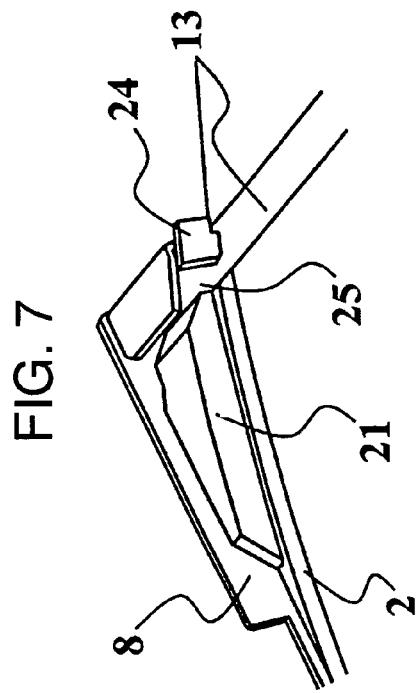
FIGS. 6A and 6B are views for explaining an effect of lowering noise in the structure of the disk drive device of the invention.
Figure 6B:
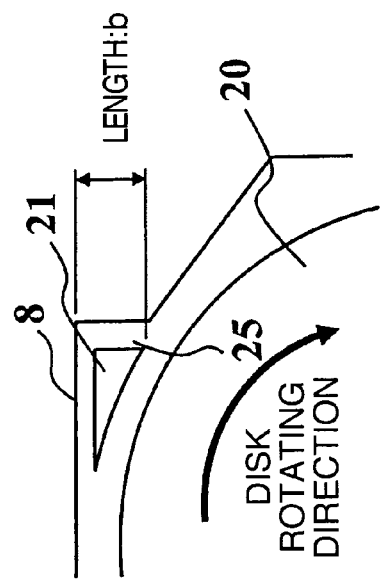

FIGS. 6A and 6B show frequency characteristics which show an effect of lowering noise in the disk drive device according to the present invention. FIG. 6A is a mimic view illustrating an air cavity 25 induced by the disc tray 2, the bottom cover 8 and the guide rack 13 in a conventional disk drive device. FIG. 6B shows noise characteristics of the conventional disk drive device and noise characteristics of the disk drive device according to the present invention over a 5 kHz frequency band. It is noted that the noise characteristics were evaluated in the 5 kHz band and the result thereof are shown since overall values are greatly affected in a range from 1 to 5 kHz due to acoustic compensation which is in general applied.

A frequency f of cavity noise caused by the air cavity 25 can be obtained by the following formula:

$$f=(v/d)/(1+(v/a))$$

where a is a acoustic velocity, v is a flow velocity and b is a length of the air cavity in the flowing direction.

By setting the acoustic velocity a to 340 m/sec, the flow velocity v to 23.7 m/sec which is about 70% of the stream of air around the outer peripheral part of the disc 20 at 24× CD speed (5,400 r.p.m.), and the length b of the air cavity in the flowing direction to 11 mm (which is actually obtained), the frequencies of induced cavity noise fall substantially in a 2 kHz band. That is, it is found that noise becomes higher in the 2 kHz band in the conventional disk drive device.

As understood from the noise characteristics shown in FIG. 6B, the structure according to the invention can lower the noise in the 2 kHz band. Thus, it can be found that the effect of lowering noise induced by a fluid force is exhibited by the disk drive device 1 according to the present invention.

Figure 7:
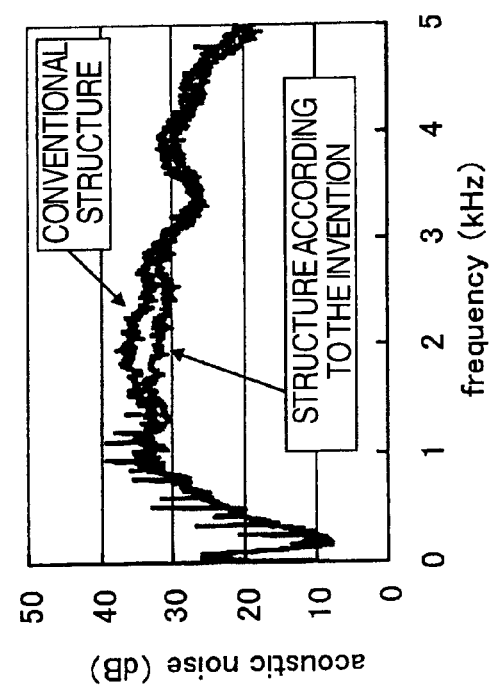
FIG. 7 is a view illustrating a peripheral structure of a disc tray in a disk drive device in another embodiment of the invention.

FIG. 7 shows another embodiment of a noise lowering structure according to the present invention, illustrating the peripheral structure of the disc tray and the guide rack.

In the case of the structure of a conventional disc tray, it is required to block streams caused by the branches and the crossing shown in FIGS. 2A and 2B. In this embodiment, a member 24 for restricting a stream is incorporated in a stream crossing part. The stream restricting member 24 is provided to the guide rack 13 so as to define a slight gap with respect to a stepped part in the disc tray 2, in order to prevent the moving disc tray 2 from making contact and interfering with the guide rack 13 which is stationary during loading or unloading operation of the disk drive device. Further, in view of manufacturing tolerances of the components and unevenness in assembly, it goes without saying that the necessity of provision of the gap is inevitable.

Further, in the configuration of this embodiment, since the device housing is formed in fitting combination between the bottom cover 8 and the top cover 9 which are bent products, fine cavities and gaps are inevitably formed in the combined part. These fine cavities and gaps can be blocked by the stream restricting member 24, thereby it is possible to insulate various noises generated in the disk drive device.

Figure 8A:
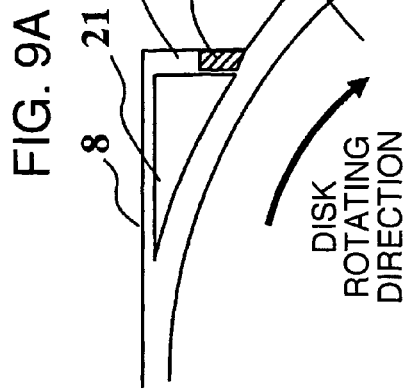
FIGS. 8A and 8B are views for explaining an effect of lowering noise in the air cavity, which is obtained by a stream restricting member according to the invention.
Figure 8B:
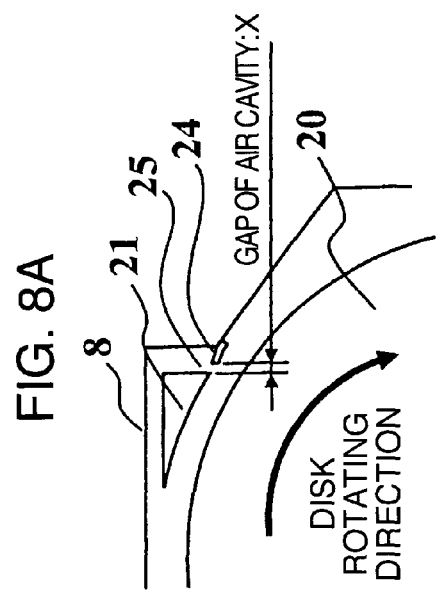

FIGS. 8A and 8B show the effect of lowering noise as to a gap by the air cavity 25 between the stream restricting member 24 and the stepped part of the disc tray 2 in the structure in FIG. 7. FIG. 8A is a mimic structural view for explanation while FIG. 8B shows a noise characteristic caused by the gap. The air cavity gap between the stream restricting member 24 and the stepped part of the disc tray 2 is denoted by X.

It is understood that an increase in the noise caused by the gap of the air cavity 25 in the disk drive device during rotation of the disc 20 is extremely small with respect to a reference value (0 dB) which is a noise value obtained in a completely shielded condition, when the gap is in the range to about 3 mm, as shown in FIG. 8B, but when the gap exceeds 3 mm, an increase in the noise becomes abruptly higher. In the case of no stream restricting member 24 in the disk drive device 1, the gap of the air cavity is about 4 mm, and accordingly, it is possible to exhibit such an effect that the provision of the stream restricting member 24 can suppress the noise by about 2 dB at maximum (when the gap of the cavity 25 is completely blocked). The reason why the noise lowering effect is exhibited by a nonlinear curve is for the relationship to a flow velocity around the outer peripheral side surface of the disc 20 and the gap of the air cavity 25. It is noted that the results of the noise lowering effect as shown were obtained at a 24× CD speed (5,400 r.p.m.) at which the noise is highest in the disk drive device 1. The gap of the air cavity has to be not less than 0.5 mm in view of manufacturing tolerances of the components and unevenness in assembly, but to be not greater than 2 mm in order to ensure the stiffness of the stream restricting member 24. Thus, the gap of the air cavity 25 in the case of the provision of the stream restricting member 24 according to the present invention as shown in FIG. 7, is set to be not less than 0.5 mm but not greater than 2 mm. With this configuration, the stream of air along the outer periphery of the disc 20 can be restrained, and in particular, it is possible to lower the cavity noise by the gap (air cavity 25) between the disc tray 2 and the housing part.

Figure 9A:
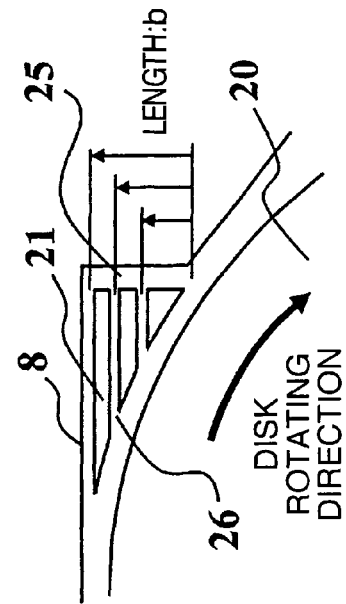
FIGS. 9A and 9B are views illustrating a peripheral structure of a disc tray in a disk drive device of another embodiment of the invention.
Figure 9B:
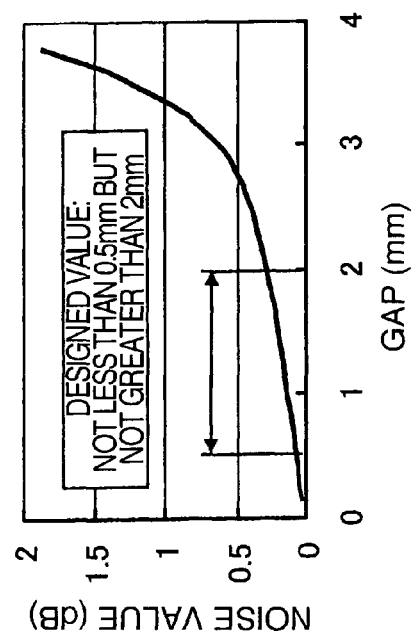

FIGS. 9A and 9B show another embodiment in which a stream restricting member 24 is used and another embodiment in which a stepped part 21 of the outer peripheral part of the circular recess formed in the disc tray 2 is used.

FIG. 9A shows such a configuration that the stream restricting member 24 is incorporated in an air cavity 25 between the stepped part 21 of the outer peripheral part of the circular recess formed in the disc tray 2 and the bottom cover 8 which constitutes the outer housing of the disk drive device 1. Similar to the explanation with reference to FIG. 8, since the disc tray 2 is movable, a slight gap is formed in order to prevent occurrence of contact and interference. Further, the stream restricting member 24 is integrally incorporated with the guide rack 13 while the gap of the air cavity is set to be not less than 0.5 mm but not greater than 2 mm. With this configuration, similar to the structure shown in FIG. 8, the stream around the disc 20 can be restrained, and in particular, cavity noise in the gap (air cavity 25) between the disc tray 2 and the housing part can be lowered.

FIG. 9B shows an embodiment having such a configuration that the length (b shown in FIG. 6) of the air cavity as shown in FIG. 6 is apparently shortened by the structure of the stepped part 21 of the outer peripheral part of the circular recess formed in the disc tray 2 so as to heighten the frequency band of cavity noise generated in the air cavity 25 part into a high frequency band. As shown in the figure, transverse grooves 26 are formed in the stepped part 21 of the outer peripheral part of the circular recess, and specifically, two transfer grooves 26 are formed in this embodiment. However, basically, one or more of transverse grooves 26 may be formed in the stepped part 21 of the outer peripheral part of the circular recess. Further, although the transverse grooves 26 shown in the drawing are straight, they may be curved along, for example, the outer periphery of the disc 20. With these configurations, it is possible to cause the frequency of cavity noise generated in the air cavity 25 part to fall in a higher frequency band in order to set the frequency to be out of the frequency band in which affection by device noise becomes maximum, thereby it is possible to aim at lowering noise.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disk drive device for recording and reproducing data to and from a disc on rotation with the use of an optical head, the disc drive device comprising:
    a cover configured to house through an intermediary of a guide rack;
    a stream restricting member, said stream restricting member being incorporated in an air gap part which is formed between an outer peripheral part of a circular recess in a disc tray and said cover,
    wherein a gap of said air gap part comprises a size between 0.5 mm and 2.0 mm, and
    wherein said stream restricting member is further configured to block one of the streams at a convergence point along the outer peripheral point of the disc, in order to reduce an amount of turbulence and/or noise which is generated at the converging point, in which air streams branch into two branches at a stepped part in a rear part of the disc tray and said branched air streams converge again.

2. A disk drive device as set forth in claim 1, wherein the gap of the air gap part is defined by said stream restricting member and said stepped part in the rear part of the disc tray.

* * * * *